United States Patent [19]
Mitchell et al.

[11] 3,977,728
[45] Aug. 31, 1976

[54] WHEEL

[75] Inventors: Stephen C. Mitchell, West Chester; Arthur P. Adamson, Cincinnati; Max F. Grandey, Hamilton; Lewis J. Stoffer, Cincinnati, all of Ohio

[73] Assignee: General Electric Company, Cincinnati, Ohio

[22] Filed: Dec. 30, 1974

[21] Appl. No.: 537,359

[52] U.S. Cl. .................................. 301/66; 301/74
[51] Int. Cl.² .......................................... B60B 1/14
[58] Field of Search ............... 301/104, 66, 73, 74, 301/63 PW

[56] References Cited
UNITED STATES PATENTS

| | | | |
|---|---|---|---|
| 755,131 | 3/1904 | Shaw et al. | 301/66 |
| 912,758 | 2/1909 | Thorp | 301/66 |
| 1,311,537 | 7/1919 | Stagg | 301/66 |
| 1,328,067 | 1/1920 | Wilson | 301/66 |
| 1,419,162 | 6/1922 | Martin | 301/74 |
| 1,534,840 | 4/1925 | Coulombe | 301/66 UX |

*Primary Examiner*—Evon C. Blunk
*Assistant Examiner*—Michael Mar
*Attorney, Agent, or Firm*—Robert C. Lampe, Jr.; Derek P. Lawrence

[57] ABSTRACT

A wheel comprising a plurality of wheel plies, each wheel ply including concentric inner and outer hoops and a plurality of circumferentially spaced spoke loops therebetween, wherein each of the spoke loops is entrapped within the hoops. In one embodiment the wheel comprises a laminate of alternating wheel plies and intermediate plies bonded together. A spoked frame comprising one or more of the wheels is provided, the frame including fairing means to substantially envelope the spokes and retain the individual wheels in their proper spacial relationship.

16 Claims, 9 Drawing Figures

U.S. Patent  Aug. 31, 1976  Sheet 1 of 3  3,977,728
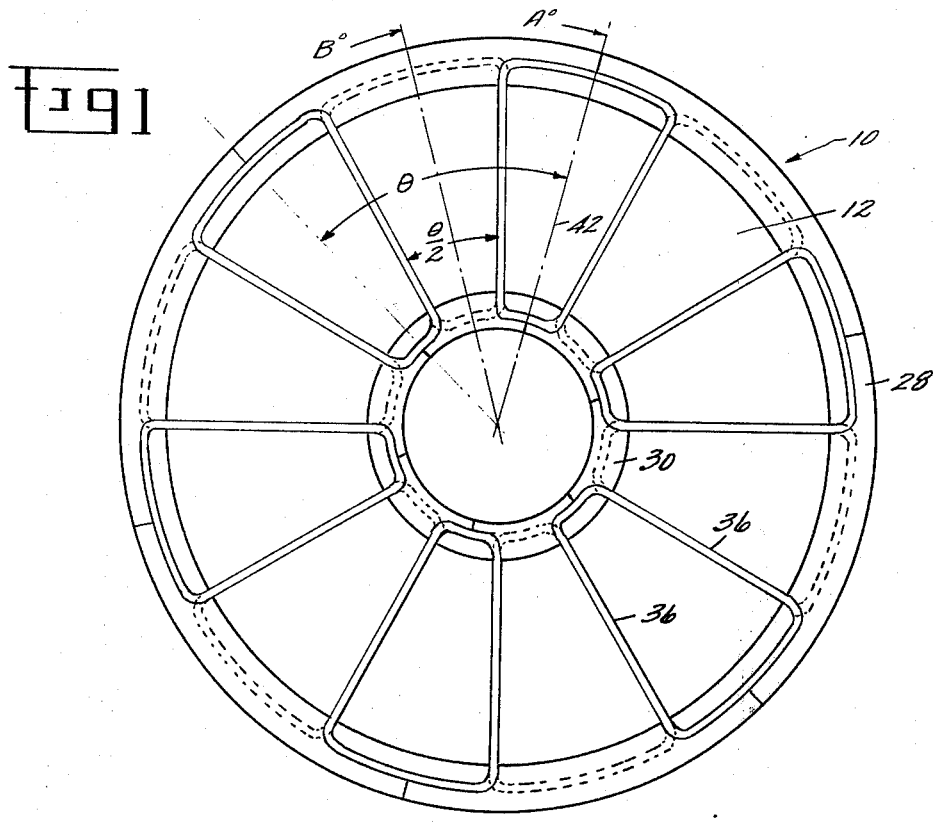
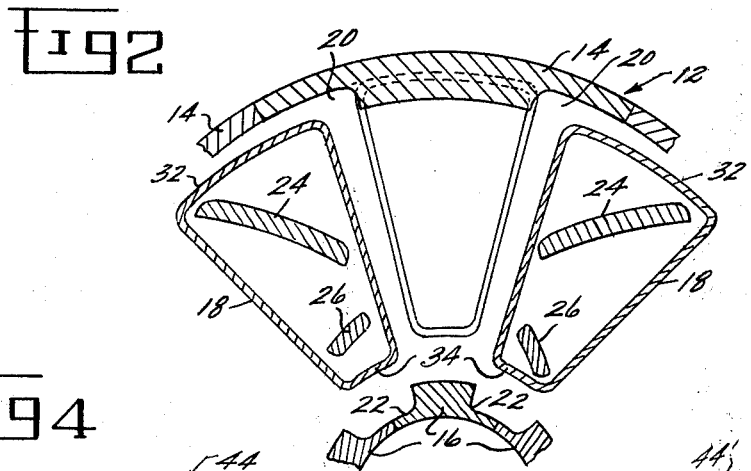
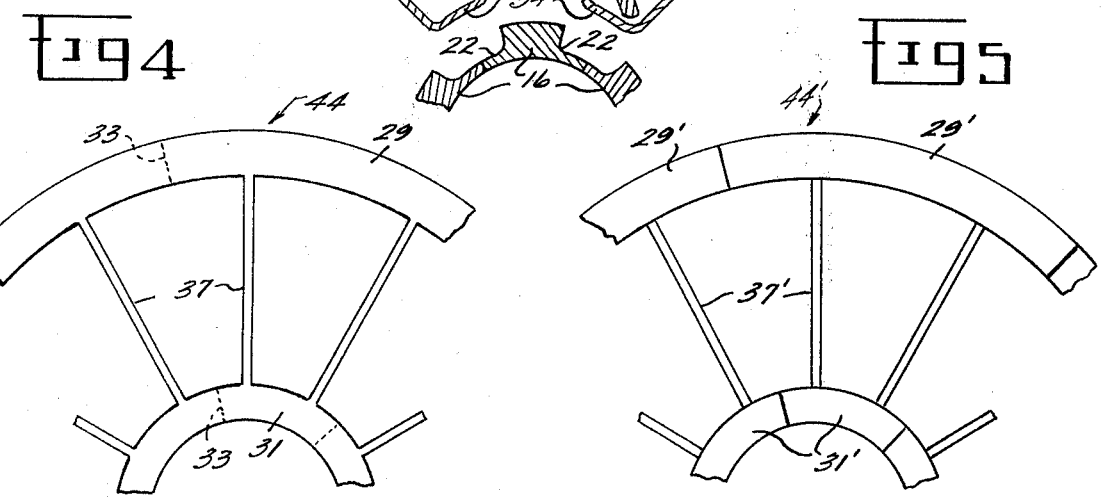

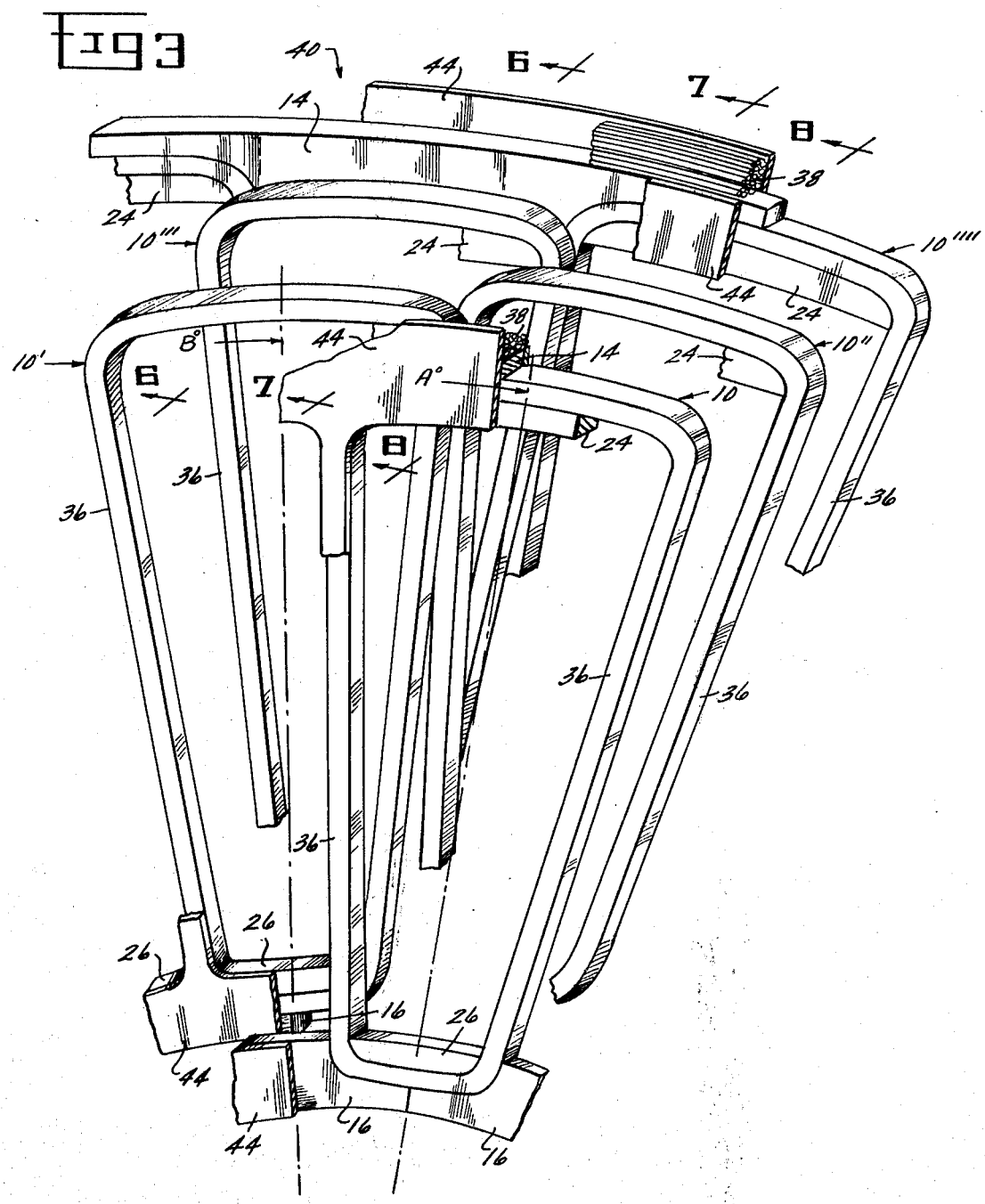

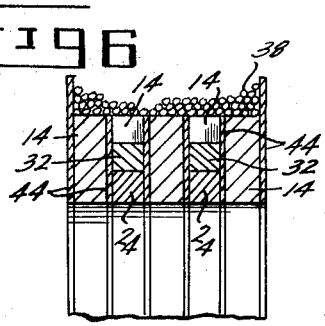
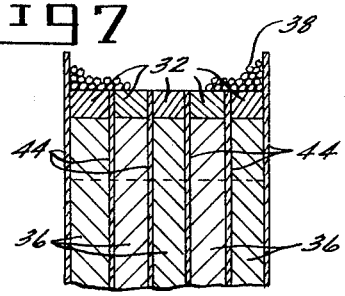
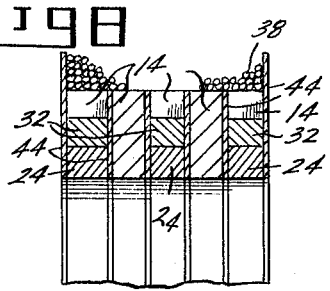
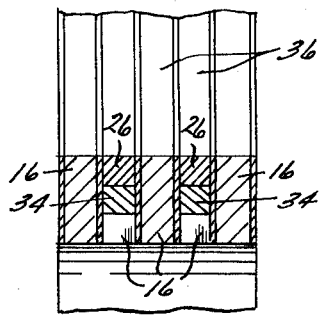
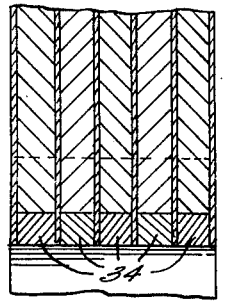
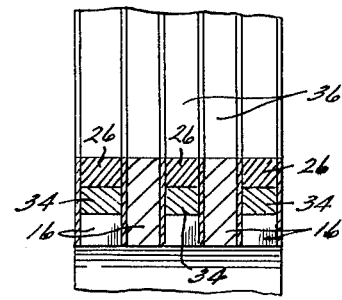
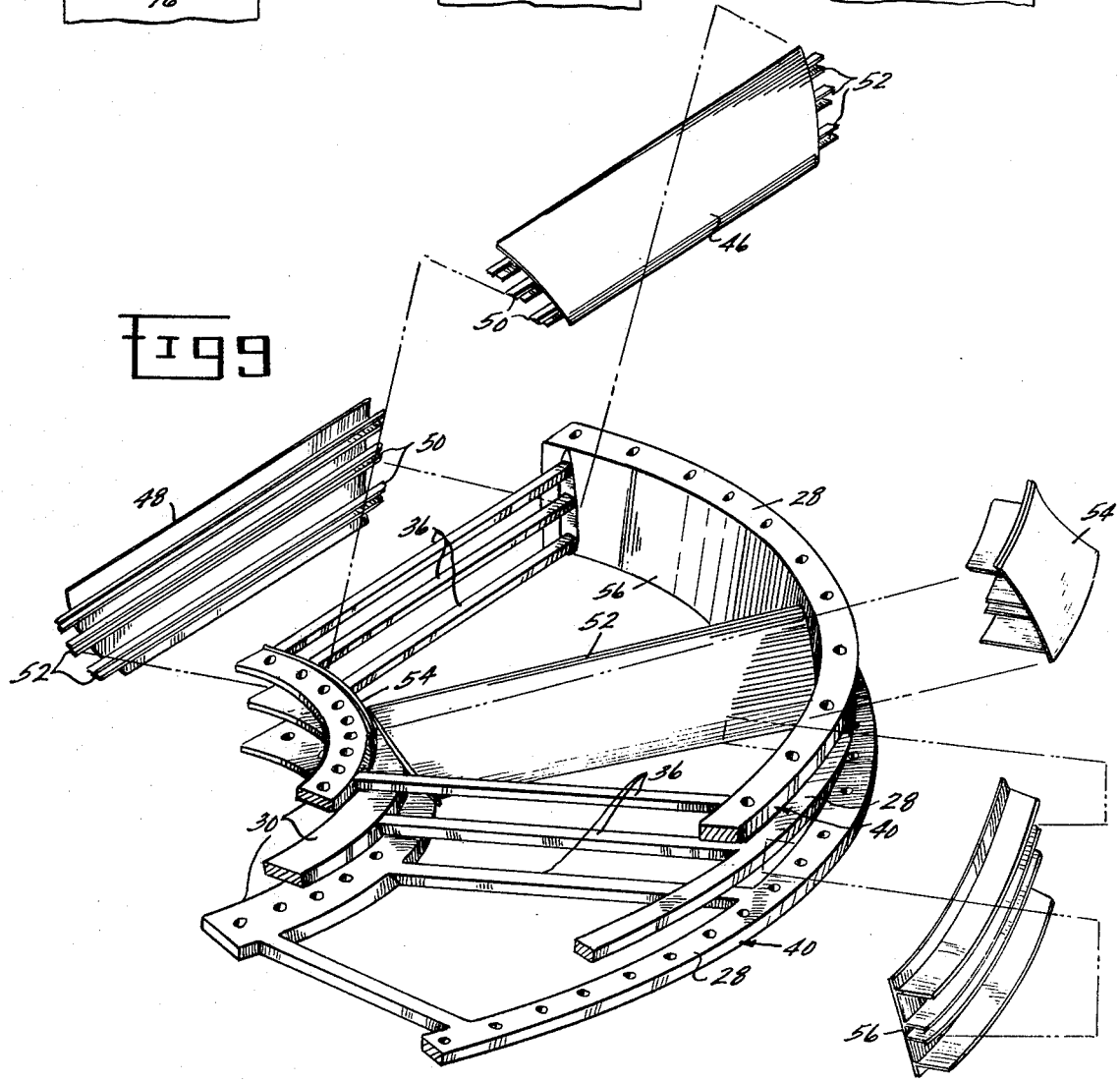

WHEEL

The invention herein described was made in the course of or under a contract, or a subcontract thereunder, with the United States Department of the Air Force.

BACKGROUND OF THE INVENTION

This invention relates to lightweight frame structures and, more particularly, to wheels for use therein.

There are numerous structures which, if fabricated of advanced, high strength composite materials, would experience significant weight reductions. The difficulty has been in developing a composite structure which, when assembled, will maintain the integrity of the heavier and bulkier state-of-the-art structures it is intended to replace. This is particularly true in the field of wheels, most notably spoked wheels, where loads which are applied to the spokes (tension or compression) must be distributed uniformly into the rims without severe load concentration.

Static, spoked wheels can be found, for example, in virtually all gas turbine engines in the form of frames. As is well known, air passing through a gas turbine engine is transported through an annular flow path, a portion of the inner and outer walls of which are analogous to the inner and outer rims of a wheel, respectively. Webs, called "struts" support the inner and outer flow paths in their proper relationship much in the manner of the spokes of a wheel, the struts being contoured for aerodynamic considerations. Additional duct work is supported from the aforedescribed engine frame to complete the annulus. This webbed structure is commonly known as a "fan frame" when air pressurized by a gas turbine engine fan is designed to pass therethrough. Presently, most engine frames are made of welded sheet metal or metal castings. Since weight is a critical consideration in aircraft gas turbine engine development, a composite frame structure would appear particularly attractive if the weight reduction could be achieved without penalty to structural integrity.

A composite frame structure is taught and claimed in co-pending U.S. Pat. application Ser. No. 522,108, by Adamson et al, filed Nov. 8, 1974, and assigned to the assignee of the present invention and the disclosure of which is incorporated herein by reference. Therein, the invention relates in part to an integral webbed structure resembling a spoked wheel for rigidly interconnecting the nacelle (the pod circumscribing a jet engine) and the engine itself. The nacelle is supported in its proper spacial relationship with the engine by means of the webbed structure. There is introduced, however, the problem of how to fabricate the integral webbed structure of Adamson et al., the subject of the present invention.

It is apparent that a lightweight, high strength wheel will aid not only the aircraft industry, but also will find application virtually everywhere a wheel could foreseeably be used. The situation facing industry, therefore, is to provide a lightweight, composite wheel having desirable load-bearing characteristics. The problem facing aircraft gas turbine engine manufacturers in particular is to provide a lightweight, composite structural frame which will withstand the rigors of the jet engine environment.

SUMMARY OF THE INVENTION

A primary object of the subject invention, therefore, is to provide an improved lightweight, composite wheel having desirable load-carrying characteristics.

Another object of the present invention is to provide an improved frame structure incorporating a lightweight, composite wheel-like member for use in a system such as a gas turbine engine.

These and other objects and advantages will be more clearly understood from the following detailed description, the drawings and specific examples, all of which are intended to be typical of rather than in any way limiting the scope of the present invention.

Briefly stated, the above objects are obtained by assembling layers of matched composite profile parts including filament wound spoke loops. Some of the matched profile parts form the inner and outer hoops of the wheel which capture the looped spokes to form pairs of spokes therebetween. When these profile parts and spoke loops are assembled in a flat plane at a predetermined orientation angle, they form one ply of the wheel structure. A second ply fabricated identical to the first ply is laid on top of the first ply at a second predetermined orientation angle. A plurality of similar plies are stacked at alternating orientation angles until the desired wheel thickness is achieved. Intermediate thin plies of oriented fiber laminates may be added between the above plies to enhance the integrity of the wheel.

A plurality of such wheels are then stacked in axial spaced relationship to each other, and a fairing means added to provide a required strut contour. The fairing means captures the spokes and retains them in their proper orientation by means of spoke channels formed on the inside of the fairing means and adapted to receive the spokes. The entire structure is bonded together to form the rigid frame.

DESCRIPTION OF THE DRAWINGS

While the specification concludes with claims particularly pointing out and distinctly claiming the subject matter which is regarded as part of the present invention, it is believed that the present invention will be more fully understood from the following description of the preferred embodiments, which are given by way of example in connection with the accompanying drawings, in which:

FIG. 1 depicts schematically one ply of a wheel constructed according to one embodiment of the present invention;

FIG. 2 is an exploded view of a portion of the wheel of FIG. 1;

FIG. 3 depicts schematically a laminate of wheel plies constructed according to one embodiment of the present invention;

FIG. 4 depicts schematically one embodiment of a portion of an intermediate ply for use in the wheel laminate of FIG. 3;

FIG. 5 is similar to FIG. 4 and depicts a second embodiment of a portion of an intermediate ply;

FIG. 6 is a cross-sectional view of the subject invention taken along line 6—6 of FIG. 3;

FIG. 7 is a cross-sectional view similar to FIG. 6 and taken along line 7—7 of FIG. 3;

FIG. 8 is a cross-sectional view similar to FIGS. 6 and 7, and taken along line 8—8 of FIG. 3; and FIG. 9 is a perspective view of a frame structure incorporating the laminated wheels of FIG. 3.

DESCRIPTION OF THE PREFERRED EMBODIMENTS

Referring to the drawings wherein like numerals correspond to like elements throughout, reference is first directed to FIG. 1 wherein a wheel ply depicted generally at 10 embodying the present invention is schematically shown. In one embodiment, this wheel ply may be considered as comprising a plurality of sectors 12, which, when placed in circumferential cooperating relationship, complete the wheel ply 10. As best shown in FIG. 2, each sector 12 is comprised of five matched profile parts of preferably advanced composite material, all bonded together.

The matched profile parts of sectors 12 are shown to include outer hoop segment 14, inner hoop segment 16, and a composite filament wound spoke loop 18 adapted to be received within recesses 20 and 22 of hoop segments 14 and 16, respectively. The sector is completed by the inclusion of outer and inner insert means 24 and 26, respectively, which are inserted within the spoke loop 18 thereby forming concentric outer and inner hoops 28 and 30, respectively (FIG. 1), when a plurality of sectors are placed in cooperating relationship. As is apparent in FIGS. 1 and 2, the arcuate opposite sides 32, 34 of spoke loop 18 are captured within the outer and inner hoop segments 14, 16, respectively, while the remaining sides form pairs of radial wheel spokes 36. It can be appreciated that the wheel ply 10 may be fabricated from as many sectors as is deemed practical. Further, the hoop segments 14 and 16 which partially comprise the outer and inner hoops 28 and 30, respectively, need not necessarily be circumferentially segmented as depicted in FIGS. 1 and 2, but may be a continuous structure having a plurality of recesses 20 and 22 adapted to receive spoke loops 18.

When the matched profile parts of sectors 12 are assembled and bonded together in a flat plane at orientation angle A degrees, they form wheel ply 10. A second wheel ply 10' is fabricated essentially identical to the first wheel ply 10 and laid on top of the first ply at an indexed orientation angle of B° (FIG. 1 in phantom and FIG. 3). Third, fourth, etc. plies (10'', 10''', etc.) of these parts are stacked at alternating orientation angles of A° and B° until the desired wheel thickness is achieved. Thus, a laminated wheel 40 as in FIG. 3 is fabricated.

Ideally, the radial centerlines 42 of circumferentially adjacent spoke loops 18 are displaced from each other by some predetermined angle $\theta$, with circumferentially adjacent spokes displaced from each other by an angle of $\theta/2$, thereby providing even spoke spacing about the wheel. Therefore, the difference in orientation angle between adjacent wheel plies 10 and 10' should be equal to $\theta/2$ in a preferred form of the invention in order to retain axial alignment of the radial spokes 36. However, it is recognized that other orientation angles may be selected to satisfy particular wheel requirements (such as imparting the effect of stagger to the wheel spoke) without departing from the subject of this invention.

Intermediate thin plies 44 of oriented fiber laminates may be added between the aforementioned wheel plies 10 to enhance the integrity of the resulting wheel 40 as depicted in FIG. 3. The intermediate plies may take several forms, two embodiments of which are depicted in FIGS. 4 and 5. In FIG. 4, the intermediate ply is an integral piece taking the form or general contour of the wheel ply 10. The spokes 37 are formed integral with the outer and inner hoops, 29 and 31, respectively. As depicted in phantom, intermediate ply 44 may comprise integral sectors, each sector having spokes itegral with outer and inner hoop segments (i.e. segmented along split lines 33). In FIG. 5, a slightly modified intermediate ply 44' is comprised of outer and inner hoop segments 29' and 31', respectively, having spoke members 37', extending therebetween. All plies, and segments or parts thereof, are bonded together, for example by the well-known resin bonding technique, to form a completed wheel 40. FIGS. 6, 7 and 8 depict the build-up of the various components at corresponding sections of FIG. 3.

A unique feature of the subject invention is the structure of the joint between spokes 36 and their integral outer and inner hoops, 28 and 30, respectively. As best shown in FIG. 3, as the wheel plies 10 are alternated in orientation between A degrees and B degrees, the spoke (36) fibers alternate left and right into the respective hoops (inner and outer). Therefore, loads that are applied to the spokes are distributed uniformly into the hoops without severe load concentration. In addition to loads delivered by the spokes of a wheel ply 10 directly into the inner and outer hoops of that wheel ply 10, shear loads are also distributed to the hoops of adjacent wheel plies 10' by transmission through the intermediate plies 44. Tensile loads in spokes 36 are resisted by inserts 24 and 26 while compressive loads are resisted by hoop segments 14 and 16.

It is further recognized that a continuous belt 38 comprising wound filaments may encircle the rim of the entire laminated wheel structure 40 as depicted in FIG. 3, thereby improving the total wheel hoop strength. Such a continous belt 38 could be affixed directly via a matrix material on which it is wound, in the well-known manner, or the filaments could be physically captured between intermediate plies 44 which are disposed as the axially forward-most and axially rearward-most plies of wheel 40, and the radial height of which exceeds slightly that of the remainder of the plies (i.e., extended outward to approximately the height of continuous belt 38).

In one embodiment of the present invention involving predominantly non-metallic materials, the individual structural elements would comprise unidirectional graphite filaments in an epoxy resin, the spoke loops comprising continuous graphite filaments in the same resin. However, it is understood that the present invention anticipates the use of any fiber embedded in any binder such as an organic resin for its structure. Further, it is anticipated that the structure could comprise any metallic system, including boron/aluminum.

Once wheels have been fabricated in accordance with the above-described invention, combinations of these wheels may be used to form other wheel-like structures (rotating or nonrotating). For example, FIG. 9 depicts a gas turbofan engine fan frame constructed, in part, from such laminated wheels 40. In particular, after a plurality of laminated wheels 40 are fabricated, they are retained in a desired predetermined axial relationship to each other. This is accomplished by the use of fairing means such as pairs of panels 46 and 48 which have channel means comprising, for example, radial stringers 50 formed upon one side thereof. The stringers cooperate to form channels 52 therebetween adapted to receive spokes 36 of wheels 40 and fixture them in the proper spacial relationship. The other side of panels 46 and 48 may be aerodynamically contoured to reduce fluid drag thereupon. Installation of pairs of panels 46 and 48 over a plurality of spokes 36 as depicted in FIG. 9 forms struts 52. Further, outer and inner flow path segments 54 and 56, respectively, may be provided between adjacent struts 52 to provide a streamlined flow contour over the outer and inner hoop structures 28 and 30, respectively. The entire structure is bonded together in one of several known manners to form a rigid, lightweight, integral structure.

It should be obvious to one skilled in the art that certain changes can be made to the above-described wheel and frame without departing from the broad invention concepts thereof. For example, the frame struts may be contoured as airfoils and the entire frame may be designed to be rotatable (as in a shrouded fan or flywheel) or stationary. Further, by judicious alignment of the wheels within the frame strut, camber and stagger may be achieved. Nonradial spokes could also be utilized to obtain camber and stagger of the struts, as well as twist. Yet further, as previously discussed, the individual wheels may be fabricated with or without the intermediate plies of oriented fiber laminates, and the intermediate plies, if used, may take several forms. In addition, the elements shown may be modified for weight reduction or other reasons depending on the strength required. For instance elements 14, 16, 24 and 26 of FIG. 2 could be interrupted with holes therethrough to lighten the structure. Still further, the concept is adaptable to any material, metal or composite. It is intended that the appended claims cover these and all similar variations in Applicants' broader inventive concept.

What we claim is:

1. A spoked frame comprising:
a plurality of axially displaced wheels having a common hub axis, at least one of said wheels comprising a laminate of a plurality of wheel plies and intermediate plies in axially alternating relationship and bonded together, wherein
said wheel plies each include an inner hoop, a radially displaced outer hoop and a plurality of circumferentially spaced continuous spoke loops, each of said loops partially entrapped within said inner hoop and said outer hoop and forming pairs of spokes extending therebetween; and
said intermediate plies each comprise a unitized spoked ply of substantially the same contour as said wheel plies;
fairing means to substantially envelope said spokes; and
retainer means to retain said wheels in a predetermined axial relationship to each other.

2. The spoked frame of claim 1 wherein sets of axially spaced spokes are enveloped in said fairing means so as to form struts.

3. The spoked frame of claim 2 wherein said fairing means comprises cooperating contoured panels.

4. The spoked frame of claim 2 wherein said struts are aerodynamically contoured.

5. The spoked frame of claim 2 wherein said retainer means include axially spaced channels formed on one side of said fairing means, each of said channels so constructed as to receive one of said spokes.

6. The spoked frame of claim 5 wherein said fairing means are bonded to said spokes.

7. A wheel comprising a laminate of a plurality of wheel plies and intermediate plies in alternating relationship, wherein
said wheel plies include an inner hoop, a radially displaced coaxial outer hoop, and a plurality of circumferentially spaced continuous spoke loops, each of said loops being partially entrapped within said inner hoop and said outer hoop and forming a pair of spokes extending therebetween;
said intermediate plies comprise spoked plies of substantially the same contour as said wheel plies.

8. The wheel of claim 7 wherein said intermediate plies comprise plies of directionally oriented fiber reinforced laminates.

9. The wheel of claim 7 wherein said inner hoop and said outer hoop are segmented.

10. The wheel of claim 7 wherein said wheel plies and said intermediate plies are bonded together.

11. The wheel of claim 6 wherein:
the radial centerlines of said circumferentially adjacent loops are displaced from each other by an angle, $\theta$;
said circumferentially adjacent spokes are displaced from each other by an angle $\theta/2$; and
each wheel ply is rotated with respect to its nearest axially displaced wheel ply by an angle $\theta/2$.

12. The wheel of claim 7 wherein the axially forward-most panel and the axially rearward-most panel are intermediate plies.

13. The wheel of claim 7 wherein each of said wheel plies includes insert means comprising portions of said inner hoop and said outer hoop, said insert means adapted to absorb tensile loads carried by said spokes.

14. The wheel of claim 7 including an intermediate ply disposed between two adjacent wheel plies for distribution of shear loads within spokes of one of said wheel plies to the other of said wheel plies by transmission through said intermediate ply.

15. The wheel of claim 10 including continuous filaments disposed about the outer rim thereof to provide added hoop strength.

16. A wheel comprising a laminate of a plurality of wheel plies, said wheel plies including:
an inner hoop;
a radially displaced coaxial outer hoop; and
a plurality of circumferentially spaced, continuous filament, spoke loops, wherein each of said loops is partially entrapped within said inner hoop and outer hoop and each spoke loop forms a pair of spokes extending therebetween.

* * * * *

UNITED STATES PATENT OFFICE
CERTIFICATE OF CORRECTION

PATENT NO. : 3,977,728
DATED : August 31, 1976
INVENTOR(S) : Stephen C. Mitchell et al It is certified that error appears in the above-identified patent and that said Letters Patent are hereby corrected as shown below:

Column 6, line 27, "claim 6" should read --claim 10--.

Column 6, line 35, "claim 7" should read --claim 11--.

Column 6, line 38, "claim 7" should read --claim 11--.

Column 6, line 42, "claim 7" should read --claim 11--.

Column 6, line 47, "claim 10" should read --claim 14--.

Signed and Sealed this

Sixteenth Day of November 1976

[SEAL]

Attest:

RUTH C. MASON
Attesting Officer

C. MARSHALL DANN
Commissioner of Patents and Trademarks